(12) United States Patent
Matsuda (10) Patent No.: US 6,404,947 B1
(45) Date of Patent: Jun. 11, 2002

(54) DEMULTIPLEXER AND DEMULTIPLEXER-RECEIVER

(75) Inventor: Kenichi Matsuda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 09/711,959

(22) Filed: Nov. 15, 2000

(30) Foreign Application Priority Data

Nov. 16, 1999 (JP) .............................. 11-324835

(51) Int. Cl.[7] .............................. G02B 6/28; H01S 3/19; H04J 14/00
(52) U.S. Cl. .............................. 385/24; 385/15; 385/18; 385/14; 385/37; 385/130; 385/131; 372/50; 372/96; 372/97; 372/99; 359/115; 359/124; 359/130
(58) Field of Search .............................. 385/24, 15, 27, 385/33, 35, 39, 129, 130, 131, 14; 372/23, 44, 45, 46, 50, 96, 97, 99, 101; 359/115, 124, 130

(56) References Cited

U.S. PATENT DOCUMENTS

| | | | | |
|---|---|---|---|---|
| 4,701,012 A | * | 10/1987 | Kaiser .......................... | 385/37 |
| 4,923,271 A | * | 5/1990 | Henry et al. ................... | 385/37 |
| 5,029,176 A | | 7/1991 | Chang-Hasnain ............ | 372/50 |
| 5,073,041 A | * | 12/1991 | Rastani ......................... | 385/33 |
| 5,724,376 A | * | 3/1998 | Kish, Jr. et al. ............... | 372/96 |
| 5,835,517 A | * | 11/1998 | Jayaraman et al. ........... | 372/50 |
| 6,122,417 A | * | 9/2000 | Jayaraman et al. ........... | 385/24 |
| 6,212,312 B1 | * | 4/2001 | Grann et al. ................... | 385/24 |

FOREIGN PATENT DOCUMENTS

JP 08-046593 2/1996 ............... 372/50 X

* cited by examiner

Primary Examiner—Brian Healy
(74) Attorney, Agent, or Firm—Eric J. Robinson; Nixon Peabody LLP (57) ABSTRACT

A demultiplexer according to the present invention includes a photonic crystalline layer, which is formed on the principal surface of a semiconductor substrate and transmits an incoming light beam with a predetermined wavelength. A wavelength at an edge of a photonic band of the photonic crystalline layer changes in a direction parallel to the principal surface of the substrate.

17 Claims, 7 Drawing Sheets

PRIOR ART

DEMULTIPLEXER AND DEMULTIPLEXER-RECEIVER

BACKGROUND OF THE INVENTION

The present invention relates to a demultiplexer for separating signal light, which has been densely wavelength-multiplexed within a relatively narrow wavelength range, into multiple optical signals corresponding to their respective wavelengths and outputting those demultiplexed signals. The present invention also relates to a demultiplexer-receiver for receiving and demultiplexing wavelength-multiplexed signal light and then converting the resultant optical signals into electrical signals.

In the field of fiber-optics communications, a technique of increasing the information-carrying capacity by utilizing wavelength division multiplexing (WDM), by which a plurality of optical signals corresponding to mutually different wavelengths are combined into a single signal, is well known. Especially in recent years, a system for multiplexing four waves with respective wavelengths around 1.55 µm (each pair of which are different from each other by 3.2 nm) or even eight waves (each pair of which are different from each other by 1.6 nm) is on the verge of being implemented. And yet research and development is vigorously carried on to realize a super-high-density fiber-optics WDM network in the near future by reducing the wavelength difference to as small as 0.8 nm. Generally speaking, though, in a WDM telecommunications network, an optical signal, which has once been multiplexed on the transmitting end, should be demultiplexed on the receiving end. Accordingly, to realize a super-high-density WDM network like this, demultiplexing must be performed at a very high resolution. It is not impossible to realize that high-resolution demultiplexing using a spectroscope including a diffraction grating. However, a more cost-effective alternative would be constructing a system including either small-sized demultiplexers or an optical receiver module with those demultiplexers integrated on a semiconductor substrate, for example.

A known optical receiver module of this type, i.e., a module with demultiplexers integrated on a semiconductor substrate, is disclosed in Japanese Laid-Open Publication No. 8-46593, for example. Hereinafter, the optical receiver module will be described with reference to FIG. 8.

Figure 8:
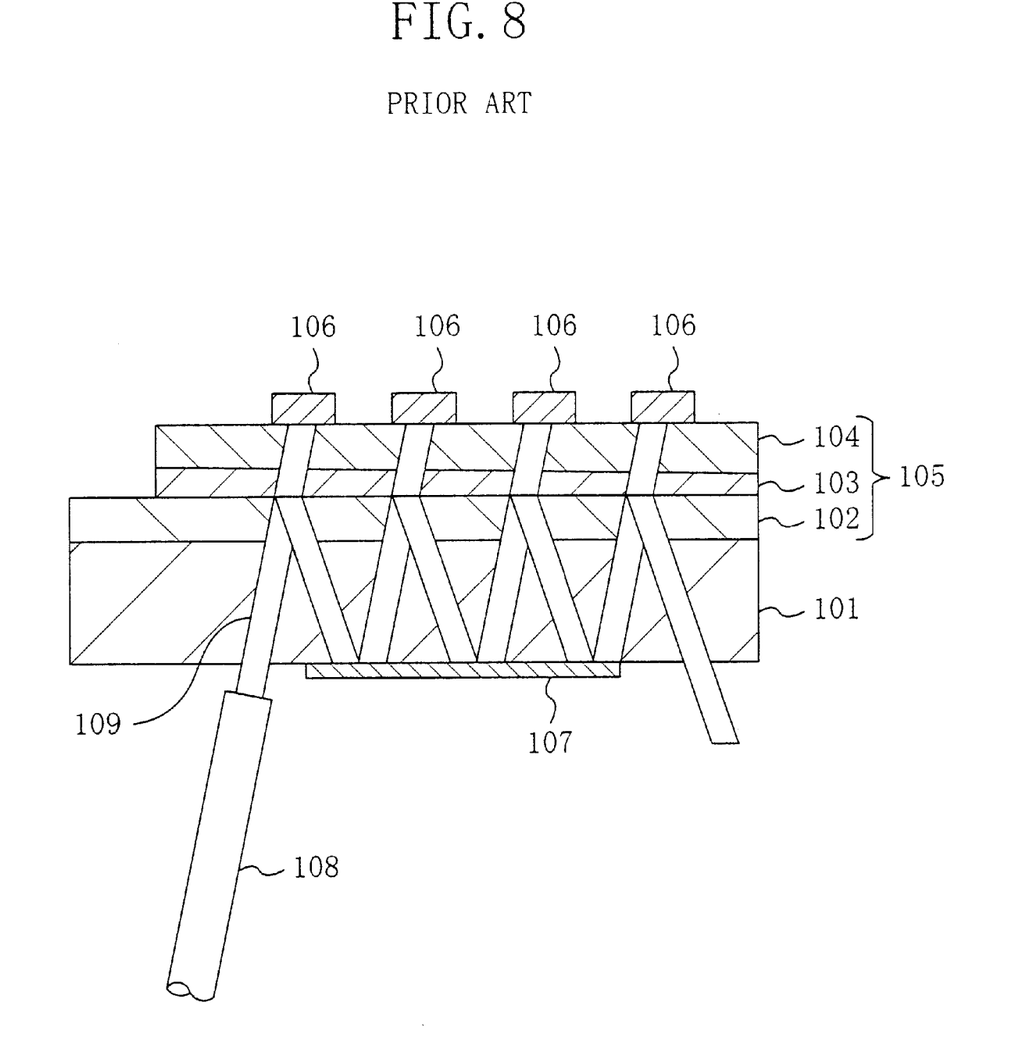
FIG. 8 is a cross-sectional view illustrating a structure for a known demultiplexer-receiver.

FIG. 8 illustrates a cross-sectional structure for a demultiplexing and light-receiving portion of an optical receiver module as disclosed in the Japanese Laid-Open Publication No. 8-46593 identified above. As shown in FIG. 8, a vertical cavity filter 105 is formed as a stack of lower and upper reflectors 102 and 104 and spacer layer 103 on the principal surface of a semiconductor substrate 101. Each of the lower and upper reflectors 102 and 104 and spacer layer 103 is formed out of a semiconductor layer. On the filter 105, multiple receivers 106 are formed just like the same number of islands. And a reflective film 107 is formed on the backside of the substrate 101 opposite to the principal surface thereof.

The filter 105 shows a transmittance of 100% against an incoming light beam with the same wavelength as one of the resonant wavelengths of the filter 105. In this structure, each of the resonant wavelengths is determined by the uneven thickness of the spacer layer 103. In addition, high-reflectance wavelength bands, termed "stop bands", exist around each resonant wavelength. An incoming wavelength-multiplexed light beam 109, which has traveled through an optical fiber bundle 108, impinges onto the backside of the substrate 101. And only a part of the light beam 109, of which the wavelength is equal to one of the resonant wavelengths, can be transmitted through the filter 105 and incident onto associated one of the receivers 106. The remaining part of the light beam 109, which has been reflected off from the filter 105, is reflected by the reflective film 107 and then incident onto the filter 105 again. The thickness of the spacer layer 103 is not constant but changes horizontally, i.e., relative to the principal surface of the substrate 101. Thus, the filter 105 has multiple resonant wavelengths for the respective receivers 106. As a result, optical signals corresponding to mutually different wavelengths are received one after another.

A resonant wavelength of the vertical cavity filter 105 is given by $$2nL \cdot \cos \theta / m$$

where n is a refractive index of the spacer layer 103, L is the thickness of the spacer layer 103 at a given point of incidence, θ is an angle of incidence of the incoming light beam 109 (i.e., an angle formed by the light beam 109 with a normal of incidence perpendicular to the principal surface of the substrate 101) and m is a natural number. Accordingly, if the angle θ of incidence of around 20 degrees changes by 1 degree, then the resonant wavelength of the filter 105 will change by about 0.63%. For example, when the resonant wavelength is around 1.55 µm, the change in wavelength will be about 10 nm. Stated otherwise, if the absolute value of the resonant wavelength should have a precision of 1 nm or less, then the shift in the angle θ of incidence should be 0.1 degrees or less.

The known optical receiver module, however, has the following drawbacks.

Firstly, the above-identified publication does not particularly point out a method of securing the optical fiber bundle 108 onto the semiconductor substrate 101 at a predetermined angle. Thus, it is difficult even for a skilled artisan to precisely define the angle θ of incidence of the incoming light beam 109.

Secondly, according to the technique disclosed in the above-identified publication, the thickness of the spacer layer 103 is not controllable accurately enough. In general, a crystal-growing method for making the thickness variable relative to the surface of a substrate is already well known in the art (see U.S. Pat. No. 5,029,176, for example). However, this method is not precise enough to determine the absolute value of the resonant wavelength just as desired. In addition, it is usually hard to apply normal semiconductor device processing, in which a great number of devices are formed at a time on a single semiconductor wafer and then divided into respective chips after a wafer process, to the fabrication of the optical receiver modules. This is because a crystal-growing method allowing for a periodic thickness change of the wafer is needed in that case. But crystals can be grown in that manner just by a few methods among the numerous ones cited in the U.S. Patent identified above.

SUMMARY OF THE INVENTION

A first object of the present invention is allowing an incoming light beam to be incident onto the cavity filter of a demultiplexer or demultiplexer-receiver at a much more accurate angle.

A second object of the present invention is controlling the horizontal thickness change of at least one layer in the cavity filter precisely enough and thereby providing multiple selectable wavelengths for the filter through normal semiconductor device processing.

To achieve the first object, a first inventive demultiplexer includes: a semiconductor substrate; and a vertical cavity filter, which is formed on the principal surface of the substrate and transmits an incoming light beam with a predetermined wavelength. A resonant wavelength of the filter changes depending on at which point on the principal surface the light beam is incident. And the substrate has a recess with a slope that reflects or refracts the light beam and thereby makes the light beam incident onto the filter.

In the first demultiplexer, a slope that will make an incoming light beam incident onto a cavity filter is formed in a semiconductor substrate. The slope can be formed easily in the backside of the substrate, opposite to its principal surface, by a wet etching process, for example, so that an exactly predetermined angle is formed between the slope and the principal surface. In such a structure, if incoming signal light is incident onto the slope of the substrate, the light will be input to the vertical cavity filter while forming the predetermined angle with the principal surface and backside of the substrate with good reproducibility. As a result, a desired resonant wavelength is selectable very accurately.

In one embodiment of the present invention, the filter preferably includes: a first distributed Bragg reflector, which is formed out of a first semiconductor layer on the principal surface of the substrate; a spacer layer, which is formed out of a second semiconductor layer on the first reflector; and a second distributed Bragg reflector, which is formed out of a third semiconductor layer on the spacer layer. At least one of the first, second and third semiconductor layers preferably has its thickness changed relative to the principal surface of the substrate. In such an embodiment, a plurality of optical signals can be extracted from a multiplexed incoming light beam just as intended.

In another embodiment of the present invention, the slope is preferably a crystallographic plane that has been exposed by a wet etching process and has a predefined crystallographic plane orientation. In general, it is easy to expose a crystallographic plane of semiconductor crystals with a predefined plane orientation by wet etching. Accordingly, the slope of the substrate can also be easily defined to form a desired angle with the backside of the substrate, for example.

To achieve the second object, a second inventive demultiplexer includes: a semiconductor substrate; and a photonic crystalline layer, which is formed on the principal surface of the substrate and transmits an incoming light beam with a predetermined wavelength. A wavelength at an edge of a photonic band of the photonic crystalline layer changes in a direction parallel to the principal surface of the substrate.

The second demultiplexer includes a photonic crystalline layer instead of the vertical cavity filter of the first demultiplexer. As is well known in the art, photonic crystals form a band structure responsive to the energy of photons. Accordingly, photons, included in a special band gap called "photonic band gap", cannot exist in the crystals. That is to say, radiation with a wavelength corresponding to the energy contained in the photonic band gap is totally reflected by the photonic crystals. On the other hand, radiation with a wavelength corresponding to the energy not contained in the photonic band gap (i.e., the energy contained in the photonic bands) is transmitted through the photonic crystals. Accordingly, in the photonic crystalline layer, if the band edge of the photonic band gap changes parallelly to the surface of the substrate, then the range where the light beam is transmitted also changes. In this manner, multiple optical signals corresponding to desired wavelengths can be extracted sequentially.

In one embodiment of the present invention, the substrate preferably has a recess with a slope that reflects or refracts the light beam and thereby makes the light beam incident onto the photonic crystalline layer. In such an embodiment, a plurality of optical signals can be extracted just as intended from even a relatively densely wavelength-multiplexed incoming light beam.

In this particular embodiment, the photonic crystalline layer is preferably made up of a plurality of dielectric or semiconductor fine lines that are arranged like a lattice. And the width of each said fine line or a gap between adjacent ones of the fine lines preferably changes in a direction parallel to the principal surface of the substrate. In such an embodiment, the band edge of the photonic band gap of the photonic crystalline layer can be changed in the direction parallel to the principal surface. Unlike the vertical cavity filter, the thickness of the photonic crystalline layer is constant horizontally. Accordingly, the photonic crystalline layer can be formed by horizontal patterning and is far more compatible with normal semiconductor device processing in which a great number of devices with the same structure are formed at a time on a single wafer.

In another embodiment of the present invention, the slope is preferably a crystallographic plane that has been exposed by a wet etching process and has a predefined crystallographic plane orientation. In general, it is easy to expose a crystallographic plane of semiconductor crystals with a predefined plane orientation by wet etching. Accordingly, the slope of the substrate can also be easily defined to form a desired angle with the backside of the substrate, for example.

To achieve the first and second objects, a third inventive demultiplexer includes a horizontal cavity filter, which is formed on a substrate and transmits a part of an incoming light beam traveling in a direction substantially parallel to the surface. The part transmitted has a predetermined wavelength. The filter includes: a first distributed Bragg reflector, which is formed to make an optical path of the light beam parallel to the surface of the substrate; and a second distributed Bragg reflector, which is formed to be spaced apart from the first reflector.

The third inventive demultiplexer includes a horizontal cavity filter for selectively transmitting a light beam traveling in a direction substantially parallel to the surface of the substrate. Accordingly, when a light beam is externally entering the demultiplexer through an optical fiber bundle, the angle of incidence can be set to a desired one easily and just as intended. As a result, a ray with a desired wavelength can be easily selected from a densely wavelength-multiplexed incoming light beam. In addition, the horizontal cavity filter can be formed by horizontal patterning and is much more compatible with normal semiconductor device processing in which a great number of devices with the same structure are formed at a time on a single wafer.

In one embodiment of the present invention, each of the first and second distributed Bragg reflectors is preferably formed by arranging a plurality of dielectric or semiconductor thin plate members on the substrate at regular intervals so that the plate members cross the optical path. In this manner, the horizontal cavity filter is easily implementable.

In another embodiment of the present invention, a resonant wavelength of the filter preferably changes depending on at which point on the substrate the light beam is incident. In such an embodiment, a plurality of optical signals can be extracted from a multiplexed incoming light beam just as intended.

In this particular embodiment, the space between the first and second distributed Bragg reflectors preferably changes and is preferably tapered or stepped in the direction parallel to the surface of the substrate.

In still another embodiment, the third demultiplexer preferably further includes: a first photonic crystalline layer, which is formed between the substrate and the filter; and a second photonic crystalline layer, which is formed on the filter. In this case, if the photonic band gaps of the first and second photonic crystalline layers, sandwiching the horizontal cavity filter vertically, have such energies as covering the entire wavelength range of the incoming light beam, then the light beam entering the filter can be confined within the filter. As a result, the loss of the incoming light beam can be reduced.

To achieve the first object, a first inventive demultiplexer-receiver includes: a semiconductor substrate; a vertical cavity filter, which is formed on the principal surface of the substrate and transmits an incoming light beam with a predetermined wavelength; and a plurality of light-receiving areas defined on the filter. A resonant wavelength of the filter changes depending on at which point on the principal surface the light beam is incident. And the substrate has a recess with a slope that reflects or refracts the light beam and thereby makes the light beam incident onto the filter.

In the first demultiplexer-receiver, a slope is also formed in the backside of a semiconductor substrate as in the first inventive demultiplexer. In this structure, if a light beam is incident onto the slope of the substrate, the light beam will be input to a vertical cavity filter while forming a predetermined angle with the principal surface and backside of the substrate with good reproducibility. As a result, a desired resonant wavelength can be selected.

In one embodiment of the present invention, the first demultiplexer-receiver preferably further includes a light-absorbing layer and a window layer that are formed in this order on the filter. The window layer preferably includes a plurality of doped regions that are defined like islands. And the light-receiving areas are preferably respective parts of the light-absorbing layer that are located under the doped regions. In this manner, the respective optical signals, resulting from the demultiplexing by the vertical cavity filter, can be received just as intended. In addition, the areas at which the demultiplexed optical signals are received are integrated with the demultiplexer monolithically, and the demultiplexed optical signals (i.e., light beams) impinge through the slope onto the light-receiving areas. Accordingly, the window layer does not function as a window for transmitting the signal light therethrough but as a passivation film that can reduce leakage current.

To achieve the second object, a second inventive demultiplexer-receiver includes: a semiconductor substrate; a photonic crystalline layer, which is formed on the principal surface of the substrate and transmits an incoming light beam with a predetermined wavelength; and a plurality of light-receiving areas defined on the photonic crystalline layer. The substrate has a recess with a slope that reflects or refracts the light beam and thereby makes the light beam incident onto the photonic crystalline layer.

In the second demultiplexer-receiver, the second inventive demultiplexer is integrated monolithically with the light-receiving areas for receiving the optical signals resulting from the demultiplexing by the second demultiplexer.

Thus, the second demultiplexer-receiver can attain the same effects as those of the second demultiplexer.

In one embodiment of the present invention, the second demultiplexer-receiver preferably further includes a light-absorbing layer and a window layer that are formed in this order on the photonic crystalline layer. The window layer preferably includes a plurality of doped regions that are defined like islands. And the light-receiving areas are preferably respective parts of the light-absorbing layer that are located under the doped regions.

DESCRIPTION OF THE PREFERRED EMBODIMENTS

Embodiment 1

Hereinafter, a first embodiment of the present invention will be described with reference to FIG. 1.

Figure 1:
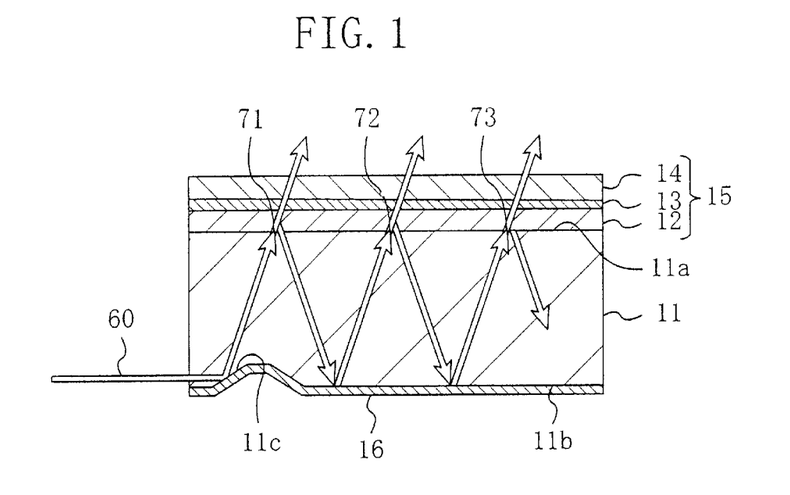
FIG. 1 is a cross-sectional view illustrating a structure for a demultiplexer according to a first embodiment of the present invention.

FIG. 1 illustrates a cross-sectional structure for a demultiplexer according to the first embodiment. As shown in FIG. 1, a vertical cavity filter 15 is formed by stacking first distributed Bragg reflector 12, spacer layer 13. and second distributed Bragg reflector 14 in this order on a first principal surface 11a of a semiconductor substrate 11 of GaAs, for example. Each of the first and second reflectors 12 and 14 may be formed by alternately and repeatedly stacking semiconductor layers of GaAs and AlAs, respectively. A total thickness of these semiconductor layers (the number of which may be about 30 to about 40) may be from about 3.89 µm to about 5.1 µm. The spacer layer 13 may be formed out of a semiconductor layer of GaAs with a thickness of about 467 nm.

In a second principal surface 11b of the substrate 11, which is on the opposite side to the first principal surface 11a, a recess with a slope 11c that reflects an incoming light beam 60 is formed. And a metal reflective film 16 is deposited over the entire second principal surface 11b as well as inside the recess.

The incoming light beam 60, which has traveled through an optical fiber bundle (not shown), for example, enters the demultiplexer in a direction parallel to the second principal surface 11b of the substrate 11. Then, the beam 60 is partially reflected by a region of the metal reflective film 16 on the slope 11c. As a result, that reflected part of the incoming light beam 60 is incident onto the vertical cavity filter 15. On the other hand, the remaining part of the incoming light beam 60, which has not been incident onto the filter 15, will be reflected off from the metal reflective film 16 again and then incident onto the filter 15.

According to the first embodiment, multiple optical signals corresponding to mutually different wavelengths have been multiplexed in the incoming light beam 60. In the following illustrative example, three optical signals associated with first, second and third wavelengths $\lambda 1$, $\lambda 2$ and $\lambda 3$, respectively (where $\lambda 1 > \lambda 2 > \lambda 3$) are supposed to have been multiplexed in the incoming light beam 60 for the sake of simplicity. Each of the GaAs and AlAs layers in the first and second reflectors 12 and 14 has its thickness determined so that an optical length thereof defined with the tilt of the optical path of the incoming light beam 60 taken into account (i.e., a product of the distance over which the light beam travels through the layer and refractive index thereof) is one-fourth as long as the second wavelength $\lambda 2$ (i.e., the center wavelength for the optical signals).

In this embodiment, the difference between first and second wavelengths $\lambda 1$ and $\lambda 2$ and between second and third wavelengths $\lambda 2$ and $\lambda 3$ may be as small as 1 nm, for example.

Accordingly, the stop bands (i.e., high-reflectance wavelength regions) of the first and second reflectors 12 and 14 can fall within the range between the first and third wavelengths $\lambda 1$ and $\lambda 3$.

As shown in FIG. 1, the thickness of the spacer layer 13 changes horizontally, i.e., relative to the first principal surface 11a. As a result, the optical lengths will be respectively $\lambda 1$, $\lambda 2$ and $\lambda 3$ at first, second and third points 71, 72 and 73 of incidence on the filter 15 on which the incoming light beam 60 is incident. Thus, at the first point 71 of incidence on the filter 15, the resonant wavelength will be $\lambda 1$. Accordingly, only the optical signal associated with the first wavelength $\lambda 1$ is transmitted through the filter 15, while the optical signals associated with the second and third wavelengths $\lambda 2$ and $\lambda 3$ are not input to the filter 15 but reflected off. In the same way, if the beam 60 is incident at the second point 72, then only the optical signal associated with the second wavelength $\lambda 2$ is transmitted through the filter 15. And if the beam 60 is incident at the third point 73, then only the optical signal associated with the third wavelength $\lambda 3$ is transmitted through the filter 15.

The primary feature of this embodiment is the slope 11c that has been formed in the second principal surface 11b of the substrate 11, because the slope 11c determines an angle at which the incoming light beam 60 is incident onto the filter 15. For example, suppose the substrate 11 has a (001) crystallographic plane as the second principal surface 11b and a (112) crystallographic plane as the slope 11c of the second principal surface 11b, respectively. The slope 11c may be exposed as a result of a wet etching process using an etchant containing hydrogen chloride (HCl) and nitric acid (HNO₃) at a volume ratio of 4:1. In that case, the slope 11c will form exactly an angle of 35.3 degrees with the second principal surface 11b. Accordingly, if the incoming light beam 60, traveling parallelly to the second principal surface 11b, is reflected by the slope 11c of the metal reflective film 16, then the reflected beam 60 will be incident onto the filter 15 with an angle of 19.4 degrees formed with a normal of incidence perpendicular to the first and second principal surfaces 11a and 11b.

In this case, if the externally incoming light beam 60 is input through an optical fiber bundle, for example, then it is easy to hold the fiber bundle on a plane parallel to the substrate 11. In this manner, the angle at which the incoming light beam 60 is incident onto the filter 15 can be kept constant very easily and highly accurately. Thus, the vertical cavity filter 15 can have much more accurate resonant wavelengths. Consequently, the present invention is effectively applicable to super-high-density WDM network in which the difference in wavelength between multiplexed optical signals should be as small as about 0.8 nm.

In the first embodiment, the slope 11c is formed in the second principal surface 11b. Alternatively, the recess with the slope 11c may be formed in a side face of the semiconductor substrate 11.

Embodiment 2

Hereinafter, a second embodiment of the present invention will be described with reference to FIG. 2.

Figure 2:
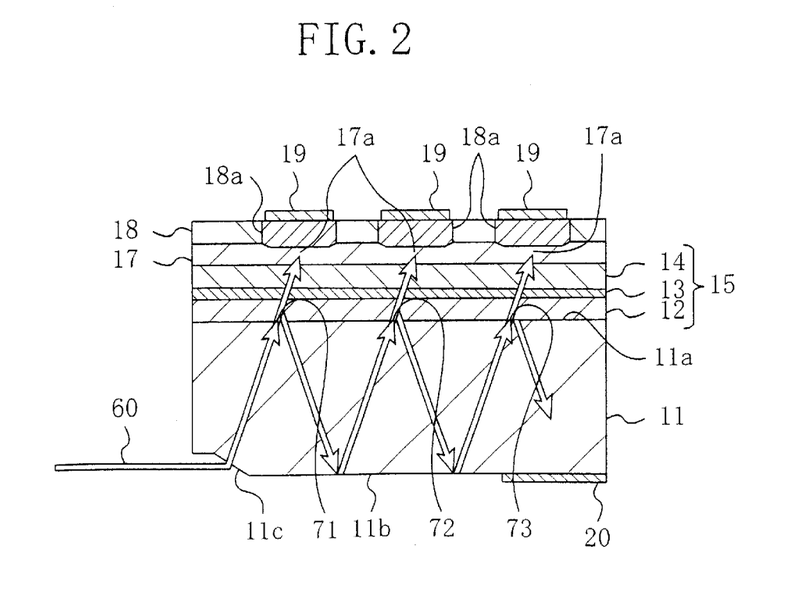
FIG. 2 is a cross-sectional view illustrating a structure for a demultiplexer-receiver according to a second embodiment of the present invention.

FIG. 2 illustrates a cross-sectional structure for a demultiplexer-receiver according to the second embodiment. In FIG. 2, the same member as the counterpart illustrated in FIG. 1 is identified by the same reference numeral and the description thereof will be omitted herein. As shown in FIG. 2, the demultiplexer-receiver of the second embodiment has a monolithic structure in which a semiconductor layer, including light-receiving areas, is formed on the vertical cavity filter 15 of the demultiplexer of the first embodiment. More specifically, a light-absorbing layer 17 of n-type lightly doped InGaAs with a thickness of about 2.5 $\mu$m, for example, and a window layer 18 of n-type lightly-doped InP with a thickness of about 1.5 $\mu$m, for example, are deposited in this order on the second distributed Bragg reflector 14 of the filter 15. In the window layer 18, three p-type doped regions 18a are defined just like so many islands by doping and diffusing a p-type dopant such as Zn. Each of the p-type doped regions 18a may have a diameter of about 80 $\mu$m. And respective areas of the light-absorbing layer 17, which are located under the p-type doped regions 18a, serve as the light-receiving areas 17a. Furthermore, negative electrodes 19 are formed out of an evaporated and deposited metal film on the respective p-type doped regions 18a.

At an edge of a second principal surface 11b of a semiconductor substrate 11 on the opposite side of a first principal surface 11a thereof, a notch with a slope 11c that refracts an incoming light beam 60 is formed. At another edge of the second principal surface 11b on the opposite side of the notch, a positive electrode 20 is formed out of another evaporated and deposited metal film.

The incoming light beam 60, which has traveled through an optical fiber bundle (not shown), for example, enters the demultiplexer-receiver in a direction. parallel to the second principal surface 11b of the substrate 11. Then, the beam 60 is refracted at the slope 11c. As a result, part of the incoming light beam 60 is incident onto the vertical cavity filter 15. The remaining part of the incoming light beam 60, which has not been incident onto the filter 15, will also be incident onto the filter 15 afterwards. In this manner, if conditions for total reflection are met, a reflectance of 100% can be obtained without providing any reflective film on the second principal surface 11b.

Suppose three optical signals corresponding to first, second and third wavelengths $\lambda 1$, $\lambda 2$ and $\lambda 3$, respectively, have been multiplexed in the incoming light beam 60 as in the first embodiment. If the beam 60 is incident at the first point

71, only the optical signal associated with the first wavelength λ1 is transmitted through the vertical cavity filter 15 as described above. In the same way, if the beam 60 is incident at the second point 72, then only the optical signal associated with the second wavelength λ2 is transmitted through the filter 15. And if the beam 60 is incident at the third point 73, then only the optical signal associated with the third wavelength λ3 is transmitted through the filter 15.

After having been transmitted through the filter 15, these optical signals corresponding to respectively predetermined wavelengths are received at their associated light-receiving areas 17a and then detected as photocurrents flowing between the positive and negative electrodes 20 and 19.

The primary feature of this embodiment is the slope 11c that has been formed at the edge of the second principal surface 11b of the substrate 11, because the slope 11c determines an angle at which the incoming light beam 60 is incident onto the filter 15. For example, suppose the slope 11c is a (112) crystallographic plane that has been exposed by a wet etching process. In that case, the slope 11c will form exactly an angle of 35.3 degrees with the second principal surface 11b. Accordingly, if the incoming light beam 60, traveling parallelly to the second principal surface 11b, is refracted at the slope 11c, then the refracted beam 60 will be incident onto the filter 15 with an angle of 49.0 degrees formed with a normal of incidence perpendicular to the first and second principal surfaces 11a and 11b.

In this case, if the externally incoming light beam 60 is input through an optical fiber bundle, for example, then it is easy to hold the fiber bundle on a plane parallel to the substrate 11. In this manner, the angle at which the incoming light beam 60 is incident onto the filter 15 can be kept constant very easily and highly accurately. Thus, the vertical cavity filter 15 can have much more accurate resonant wavelengths. Consequently, the present invention is effectively applicable to even a super-high-density WDM network in which the wavelength difference between multiplexed optical signals should be as small as about 0.8 nm.

In the second embodiment, the slope 11c is formed as a part of the notch. Alternatively, the slope 11c may be formed in a recess as in the first embodiment. In that case, a metal reflective film 16 may be formed on the slope 11c.

Also, in the second embodiment, the slope 11c is formed at an edge of the second principal surface 11b. Alternatively, a recess with the slope 11c may be formed in a side face of the substrate 11.

Embodiment 3

Hereinafter, a third embodiment of the present invention will be described with reference to FIG. 3 and FIGS. 4A through 4C.

Figure 3:
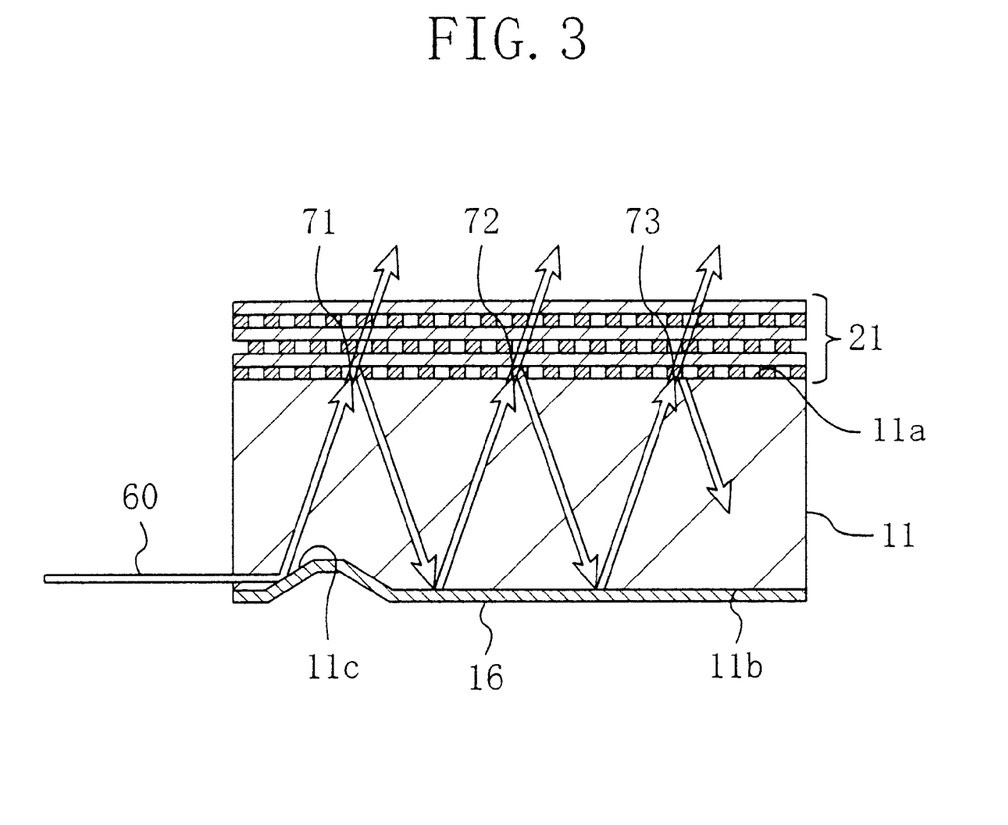
FIG. 3 is a cross-sectional view illustrating a structure for a demultiplexer according to a third embodiment of the present invention.

FIG. 3 illustrates a cross-sectional structure for a demultiplexer according to the third embodiment. In FIG. 3, the same member as the counterpart illustrated in FIG. 1 is identified by the same reference numeral and the description thereof will be omitted herein. As shown in FIG. 3, the demultiplexer of the third embodiment includes a photonic crystalline layer 21, not the vertical cavity filter 15, on a first principal surface 11a of a semiconductor substrate 11. The photonic crystalline layer 21 is also provided to selectively extract a plurality of optical signals corresponding to multiple wavelengths from the input wavelength-multiplexed signal light.

The photonic crystalline layer 21 is formed as a stack of a number of (e.g., eight) lattice layers. In each of the lattice layers, multiple dielectric (e.g., silicon dioxide ($SiO_2$)) fine lines with a width of about 360 nm or multiple semiconductor (e.g., GaAs) fine lines with a width of about 170 nm are arranged to form a lattice. As used herein, the "photonic crystalline layer" is a multilayer structure in which the locations of the fine lines in the $n^{th}$ layer (or the $(n+1)^{th}$ layer) shift from those of the fine lines in the $(n+2)^{th}$ layer (or the $(n+3)^{th}$ layer) by a half period. It should be noted that n is herein an integer equal to or greater than 1. In addition, the widths of the fine lines and gaps between adjacent ones of them change in a direction parallel to the first principal surface 11a. Accordingly, the wavelength at an edge of the photonic band of the photonic crystalline layer 21 changes parallelly to the first principal surface 11a, i.e., depending on a point of the photonic crystalline layer 21 on which a light beam has been incident.

The incoming light beam 60, which has traveled through an optical fiber bundle (not shown), for example, enters the demultiplexer in a direction parallel to the second principal surface 11b of the substrate 11. Then, the beam 60 is partially reflected by a region of the metal reflective film 16 on the slope 11c. As a result, that reflected part of the incoming light beam 60 is incident onto the photonic crystalline layer 21. On the other hand, the remaining part of the incoming light beam 60, which has not been incident onto the layer 21, will be reflected off from the metal reflective film 16 again and then incident onto the layer 21.

Figure 4A:
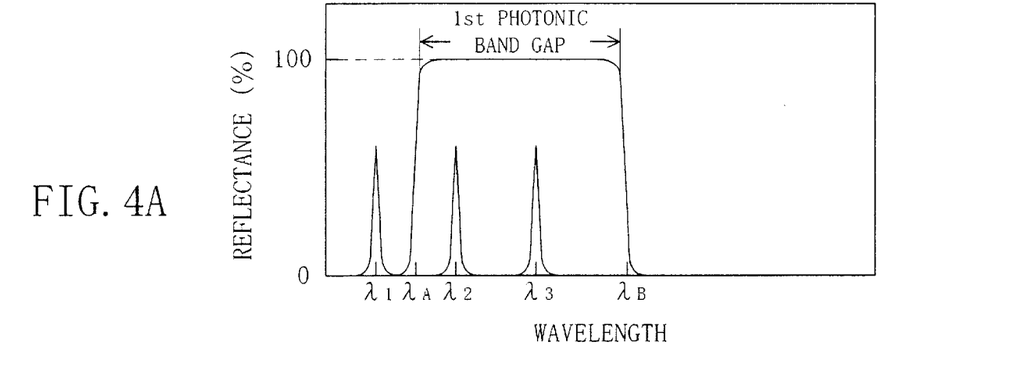
FIGS. 4A through 4C are graphs schematically illustrating how a photonic crystalline layer extracts optical signals from wavelength-multiplexed signal light for respective points of incidence in the demultiplexer of the third embodiment.
Figure 4B:
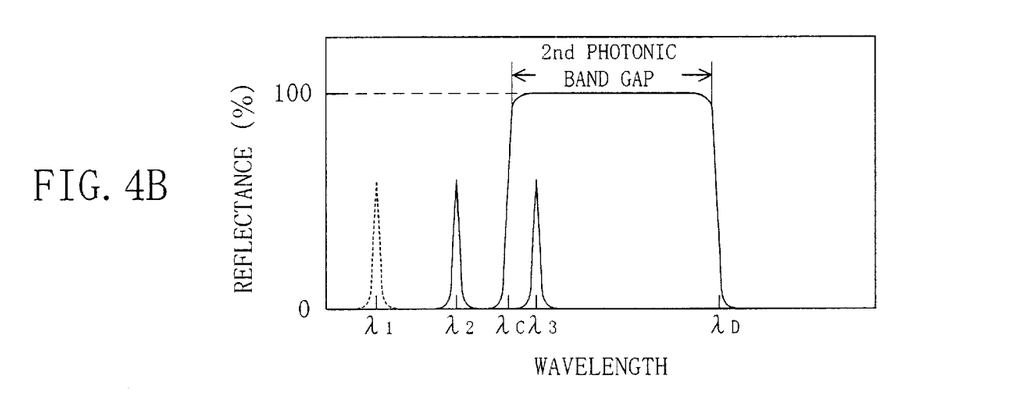
Figure 4C:
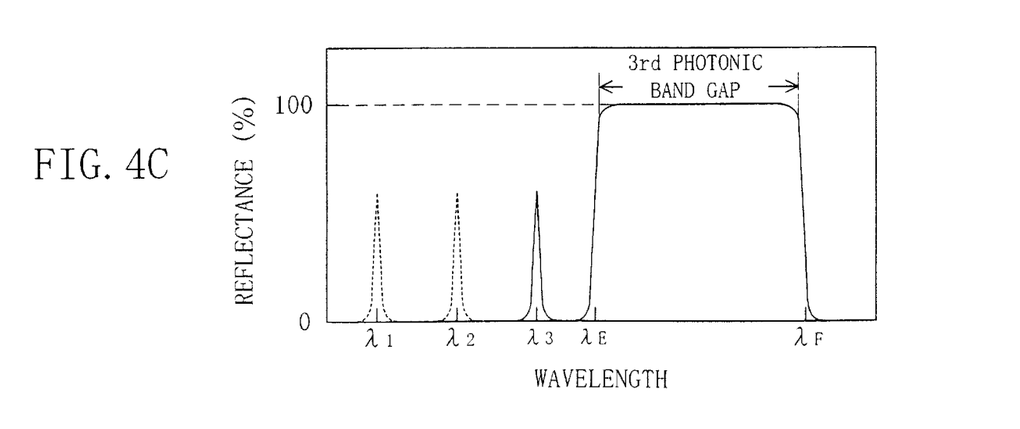

Hereinafter, it will be described with reference to FIGS. 4A through 4C how the photonic crystalline layer 21 extracts respective optical signals from the incoming wavelength-multiplexed light beam 60. As in the first embodiment, three optical signals associated with three different wavelengths λ1, λ2 and λ3 have been multiplexed in the incoming light beam 60. In FIGS. 4A through 4C, the abscissa indicates the wavelength, while the ordinate indicates the reflectance of the photonic crystalline layer 21.

First, as shown in FIG. 4A, if the incoming light beam 60 is incident at the first point 71 on the photonic crystalline layer 21, then light beams with the second and third wavelengths λ2 and λ3 are totally reflected by the photonic crystalline layer 21. This is because the second and third wavelengths λ2 and λ3 correspond to respective energies included in a first photonic band gap defined by band edge wavelengths λA and λB. On the other hand, since a light beam with the first wavelength λ1 corresponds to an energy smaller than the first photonic band gap (i.e., an energy included in a photonic band), the reflectance of the light beam with the first wavelength λ1 will be almost 0%. As a result, only the light beam with the first wavelength λ1 is transmitted through the photonic crystalline layer 21.

Next, as shown in FIG. 4B, if the incoming light beam 60 is incident at the second point 72 on the photonic crystalline layer 21, then the light beam with the third wavelength λ3 is totally reflected by the photonic crystalline layer 21. This is because the third wavelength λ3 corresponds to an energy included in a second photonic band gap defined by band edge wavelengths λC and λD, which are shorter than the counterparts λA and λB of the first photonic band gap. That is to say, the second photonic band gap corresponds to energies higher than those represented by the first photonic band gap. As a result, the light beams with the first and second wavelengths λ1 and λ2 are reflected at almost 0% this time. However, since the light beam with the first wavelength λ1 has already been transmitted through the photonic crystalline layer 21, only the light beam with the second wavelength λ2 is transmitted through the photonic crystalline layer 21.

Then, as shown in FIG. 4C, if the incoming light beam 60 is incident at the third point 73 on the photonic crystalline layer 21, then none of the light beams is reflected by the photonic crystalline layer 21. This is because the first, second and third wavelengths λ1, λ2 and λ3 all correspond to energies that are not included in a third photonic band gap (i.e., energies within the photonic band) defined by band edge wavelengths λE and λF, which are even shorter than the counterparts λC and λD of the second photonic band gap. As a result, the remaining light beam that has not been transmitted yet, i.e., the light beam with the third wavelength λ3, is transmitted through the photonic crystalline layer 21 this time.

As described above, the photonic crystalline layer 21 is used according to the third embodiment instead of the vertical cavity filter. Thus, if the photonic crystalline layer 21 has been patterned in a direction parallel to the first principal surface 11a of the substrate 11, the wavelengths λA, λB and so on at the edges of photonic bands can be changed.

That is to say, if the vertical cavity filter 15 is used as in the first embodiment, then the filter 15 should have its thickness increased or decreased to make the resonant wavelength changeable relative to the first principal surface 11a. In contrast, if the photonic crystalline layer 21 is used, the photonic band edges, determining the resonant wavelengths, can be changed by forming the layer 21 through a patterning process in the direction parallel to the first principal surface 11a. As a result, the demultiplexer of the third embodiment does not have to have its thickness changed unlike the vertical cavity filter 15. Accordingly, this embodiment is much more compatible with normal semiconductor device processing, in which a great number of devices are formed at a time on a single semiconductor wafer.

In the third embodiment, the photonic crystalline layer 21 is formed in such a manner as to make wavelengths at respective edges of the photonic bands changeable in the direction parallel to the first principal surface 11a. Alternatively, the densely wavelength-multiplexed incoming light beam may be dispersed anomalously at various angles by utilizing Super Prism effects.

In the third embodiment, the slope 11c is formed in the second principal surface 11b. Alternatively, the recess with the slope 11c may be formed in a side face of the semiconductor substrate 11.

Embodiment 4

Hereinafter, a fourth embodiment of the present invention will be described with reference to FIG. 5.

Figure 5:
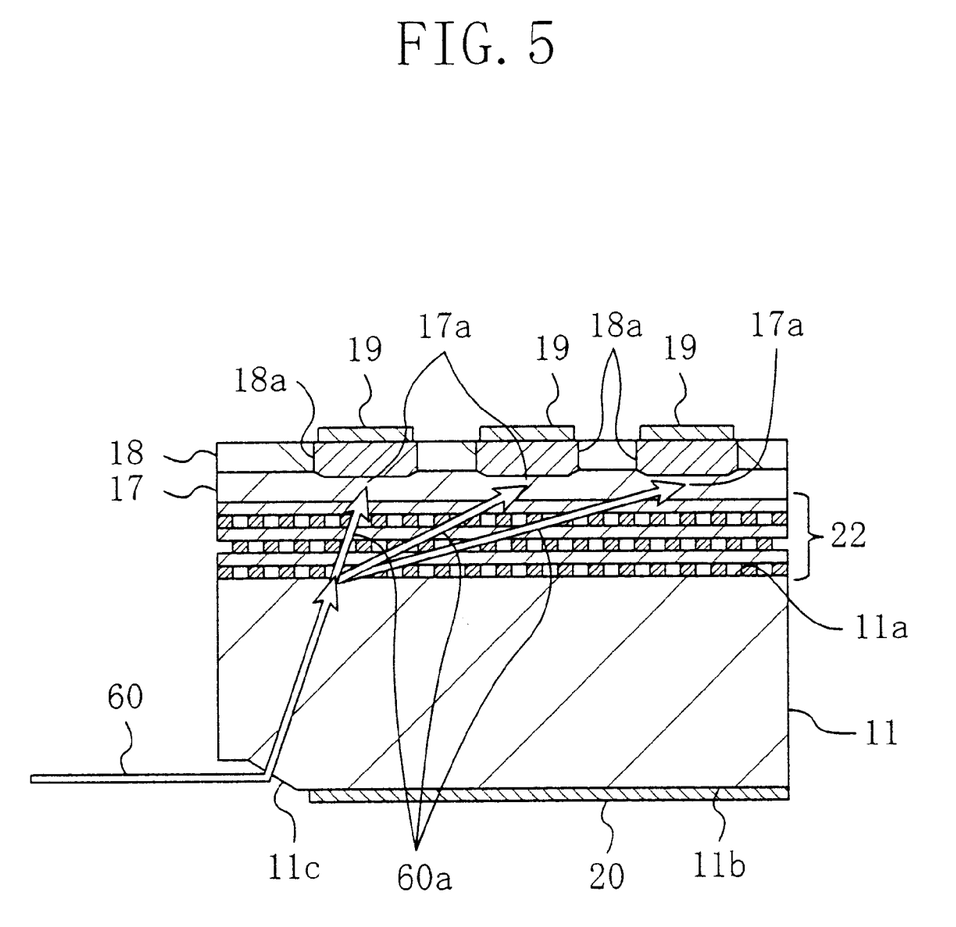
FIG. 5 is a cross-sectional view illustrating a structure for a demultiplexer-receiver according to a fourth embodiment of the present invention.

FIG. 5 illustrates a cross-sectional structure for a demultiplexer-receiver according to the fourth embodiment. In FIG. 5, the same member as the counterpart illustrated in FIG. 3 is identified by the same reference numeral. As shown in FIG. 5, the demultiplexer-receiver of the fourth embodiment has a monolithic structure in which a semiconductor layer, including light-receiving areas, is formed on a photonic crystalline layer 22.

The photonic crystalline layer 22 is formed as a stack of a number of lattice layers. In each of the lattice layers, multiple dielectric (e.g., $SiO_2$) fine lines with a width of about 360 nm or multiple semiconductor (e.g., GaAs) fine lines with a width of about 170 nm are arranged to form a lattice.

The photonic crystalline layer 22 is a multilayer structure in which the locations of the fine lines in the nth layer (or the $(n+1)^{th}$ layer) shift from those of the fine lines in the $(n+2)^{th}$ layer (or the $(n+3)^{th}$ layer) by a half period.

A light-absorbing layer 17 of n-type lightly doped InGaAs with a thickness of about 2.5 μm, for example, and a window layer 18 of n-type lightly-doped InP with a thickness of about 1.5 μm, for example, are deposited in this order on the photonic crystalline layer 22. In the window layer 18, three p-type doped regions 18a are defined just like so many islands by doping and diffusing a p-type dopant such as Zn. Each of the p-type doped regions 18a may have a diameter of approximately 30 μm. And respective areas of the light-absorbing layer 17, which are located under the p-type doped regions 18a, serve as light-receiving areas 17a. Furthermore, negative electrodes 19 are formed out of an evaporated and deposited metal film on the respective p-type doped regions 18a.

At an edge of a second principal surface 11b of a semiconductor substrate 11, a notch with a slope 11c that refracts an incoming light beam 60 is formed. On the second principal surface 11b, a positive electrode 20 is formed out of another evaporated and deposited metal film.

The incoming light beam 60, which has traveled through an optical fiber bundle (not shown), for example, enters the demultiplexer-receiver in a direction parallel to the second principal surface 11b of the substrate 11. Then, the beam 60 is refracted at the slope 11c and incident onto the photonic crystalline layer 22.

The photonic crystalline layer 22 of the fourth embodiment realizes demultiplexing by taking advantage of anomalous dispersion effects. The photonic crystals exhibit the anomalous dispersion effects, by which a refractive index greatly changes within an extremely narrow wavelength range. Thus, thanks to the anomalous dispersion effects, the densely wavelength-multiplexed incoming light beam 60 can be dispersed at a broad variety of angles. Accordingly, if the dispersed rays 60a of the incoming light beam 60 outgo through the photonic crystalline layer 22 to be incident onto the respective light-receiving areas 17a, then those rays with mutually different wavelengths can be detected as photocurrents flowing between the negative and positive electrodes 19 and 20.

In this embodiment, the photonic crystalline layer 22 is formed as a stack of lattice layers so that dielectric or semiconductor fine lines are arranged like a lattice in each of these layers. In this case, it is not easy to form the light-absorbing and window layers 17 and 18 on the photonic crystalline layer 22 by a crystal-growing process. However, such a structure is easily obtained by utilizing a wafer bonding technique.

In the fourth embodiment, the slope 11c is formed at the edge of the second principal surface 11b. Alternatively, a recess with the slope 11c may be formed in a side face of the substrate 11.

Embodiment 5

Hereinafter, a fifth embodiment of the present invention will be described with reference to FIGS. 6A and 6B.

Figure 6A:
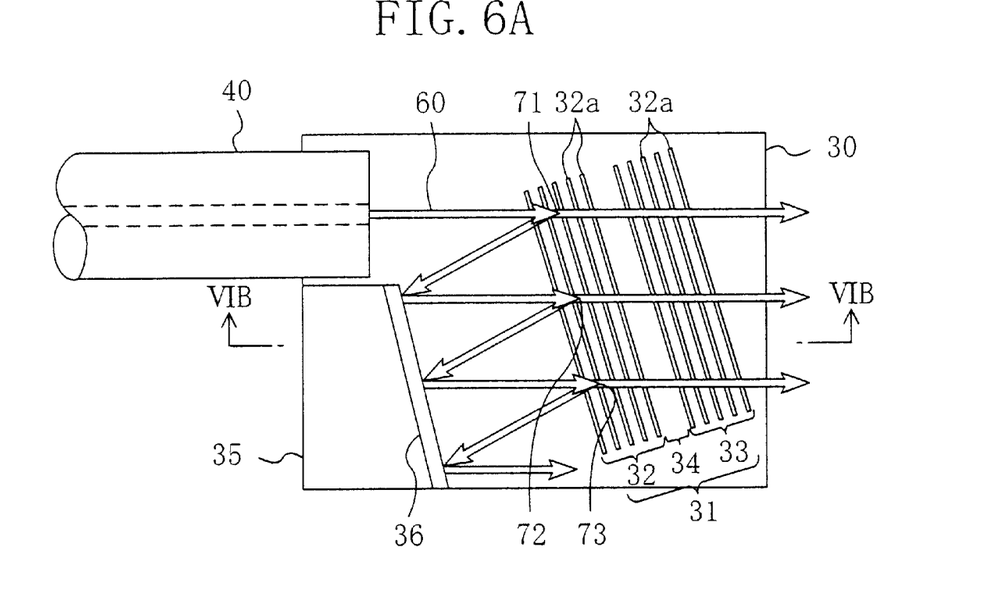
FIGS. 6A and 6B are respectively a plan view and a ross-sectional view, taken along the line VIB—VIB in FIG. 6A, of a demultiplexer according to a fifth embodiment of the present invention.
Figure 6B:
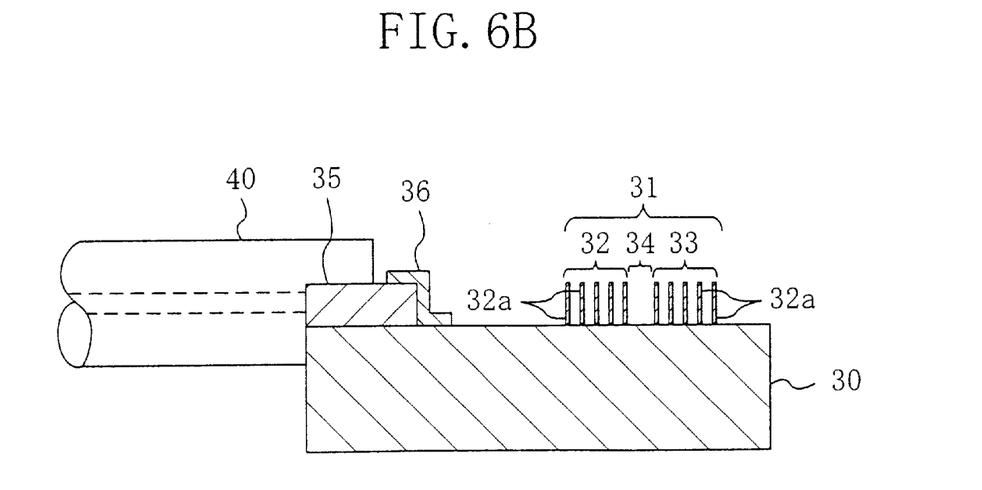

FIGS. 6A and 6B respectively illustrate a planar layout and a cross-sectional structure, taken along the line VIB—VIB in FIG. 6A, of a demultiplexer according to the fifth embodiment. As shown in FIGS. 6A and 6B, an optical fiber bundle 40, through which an incoming light beam 60 travels in a direction parallel to the surface of a substrate 30 of Si or GaAs, for example, is secured to an upper edge of the substrate 30. And a horizontal cavity filter 31 is formed on the substrate 30 to receive the incoming light beam 60 at a predetermined angle at an edge thereof.

The horizontal cavity filter 31 includes first and second distributed Bragg reflectors 32 and 33. Each of the first and second distributed Bragg reflectors 32 and 33 is made up of a plurality of thin plate members 32a that are placed to cross the optical path of the light beam 60 with each adjacent pair of members 32a spaced by about 447 nm. The space 34 between the first and second reflectors 32 and 33 is not constant but varied. In the illustrated embodiment, each thin plate member 32a is made of a dielectric material (e.g., $SiO_2$) with a thickness of about 307 nm or a semiconductor material (e.g., GaAs) with a thickness of about 127 nm.

Furthermore, a reflective block member 35 is placed at such a position on the substrate 30 that the light, reflected from the first reflector 32, will be incident onto the first reflector 32 again. A metal reflective film 36 has been deposited on a surface of the block member 35 that faces the horizontal cavity filter 31. In this case, the block member 35 may be made of the same material as the thin plate members 32a.

The incoming light beam 60, which has traveled through the optical fiber bundle 40 and in which a plurality of optical signals associated with mutually different wavelengths have been multiplexed, is partially incident onto the horizontal cavity filter 31. The other part of the light beam 60 is reflected by the metal reflective film 36 on the reflective block member 35 and then incident onto the filter 31.

As in the first embodiment, optical signals associated with the first, second and third wavelengths $\lambda 1$, $\lambda 2$ and $\lambda 3$ (where $\lambda 1 > \lambda 2 > \lambda 3$) are supposed to have been multiplexed in the incoming light beam 60. The thickness of each of the thin plate members 32a for the first and second distributed Bragg reflectors 32 and 33 and the space between adjacent ones of the members 32a are both defined so that the optical lengths thereof will be one-fourth as long as the wavelength. Specifically, the optical length as defined with the tilt of the optical path of the incoming light beam 60 taken into account (i.e., a product of the distance over which the light beam 60 travels through the member 32a and the refractive index thereof) or the space between the members 32a themselves shall be one-fourth as long as the second wavelength $\lambda 2$ (i.e., the center wavelength of the signals). In this case, supposing the gap between adjacent ones of the thin plate members 32a has been filled with the air, the optical length will be equal to the actual space between them.

According to the fifth embodiment, the difference between first and second wavelengths $\lambda 1$ and $\lambda 2$ or between the second and third wavelengths $\lambda 2$ and $\lambda 3$ may be as small as 1 nm. Thus, the stop bands (i.e., high-reflectance wavelength ranges) of the first and second distributed Bragg reflectors 32 and 33 can afford to cover all of the first, second and third wavelengths $\lambda 1$, $\lambda 2$ and $\lambda 3$.

In addition, as shown in FIG. 6A, the space 34 has its width changed within a plane parallel to the substrate 30. Accordingly, when the incoming light beam 60 is incident onto the filter 31 at a first point 71, the resultant optical length will be $\lambda 1$. When the beam 60 is incident at a second point 72, the optical length will be $\lambda 2$. And when the beam 60 is incident at a third point 73, the optical length will be $\lambda 3$. That is to say, since the resonant wavelength is $\lambda 1$ when the beam 60 is incident onto the filter 31 at the first point 71, only the light beam with the first wavelength $\lambda 1$ is transmitted through the filter 31. On the other hand, the light beams with the second and third wavelengths $\lambda 2$ and $\lambda 3$ are not input to the filter 31 but reflected off. In the same way, when the beam 60 is incident onto the filter 31 at the second point 72, only the light beam with the second wavelength $\lambda 2$ is transmitted through the filter 31. And when the beam 60 is incident onto the filter 31 at the third point 72, only the light beam with the third wavelength $\lambda 3$ is transmitted through the filter 31.

In this case, the space 34 between the reflectors 32 and 33 in the filter 31 is preferably changed in such a manner as to have its width gradually increased (i.e., tapered) from one end of the space 34 toward the other.

More preferably, the space 34 between the first and second reflectors 32 and 33 is divided lengthwise into at least the same number of sectors as that of the signals to be extracted. And each adjacent pair of sectors should have mutually different widths so that the space 34 between the reflectors 32 and 33 changes stepwise. It should be noted that the width should not change within the same sector. In such a case, since each of the sectors, corresponding to the respective points of incidence 71, 72 and 73 of the light beams to be transmitted, has a constant width, the wavelength does not change, either, within the sector. Accordingly, a good margin is ensured for misalignment of the reflectors 32 and 33 during a fabrication process, thus increasing the production yield.

The demultiplexer of the first embodiment includes the vertical cavity filter 15, in which the distributed Bragg reflectors are stacked one upon the other vertically to the surface of the substrate. On the other hand, the demultiplexer of the fifth embodiment includes the horizontal cavity filter 31, in which the distributed Bragg reflectors are arranged side by side in a direction parallel to the surface of the substrate.

When the horizontal cavity filter 31 is used, the angle of incidence of the incoming light beam 60 may be determined within a plane parallel to the surface of the substrate. Accordingly, if a V-groove is formed as a guide in the upper part of the substrate 30 to mount the optical fiber bundle 40 therein, then the angle of incidence can be defined precisely.

In addition, only by designing an appropriate mask pattern, the space 34 between the first and second distributed Bragg reflectors 32 and 33 can be changed so that the resonant wavelength will change within a plane parallel to the substrate. Unlike the vertical cavity filter 15, the thickness of the horizontal cavity filter 31 does not change vertically to the substrate surface. Thus, the fifth embodiment is much more compatible with normal semiconductor device processing in which a great number of devices are formed at a time on a single semiconductor wafer.

Embodiment 6

Hereinafter, a sixth embodiment of the present invention will be described with reference to FIGS. 7A and 7B.

Figure 7A:
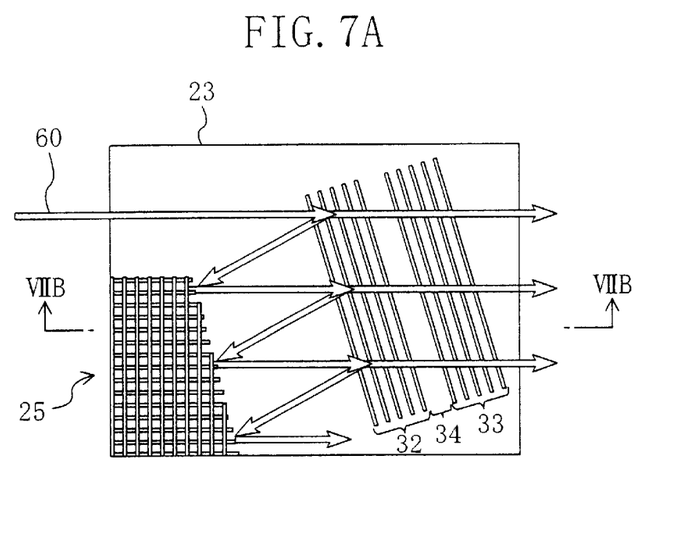
FIGS. 7A and 7B are cross-sectional views, taken along the lines VIIA—VIIA and VIIB—VIIB in FIGS. 7B and 7A, respectively, of a demultiplexer according to a sixth embodiment of the present invention.
Figure 7B:
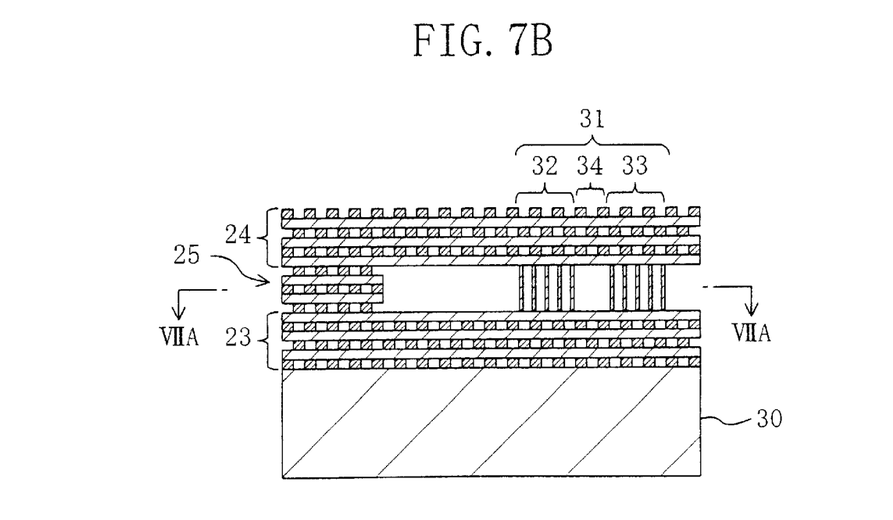

FIGS. 7A and 7B illustrate cross-sectional structures, which are taken along the lines VIIA—VIIA and VIIB—VIIB in FIGS. 7B and 7A, respectively, of a demultiplexer according to the sixth embodiment. In FIGS. 7A and 7B, the same component as the counterpart illustrated in FIGS. 6A and 6B is identified by the same reference numeral. and the description thereof will be omitted herein.

In the demultiplexer of the sixth embodiment shown in FIGS. 7A and 7B, a horizontal cavity filter 31 is sandwiched between first and second photonic crystalline layers 23 and 24. The first photonic crystalline layer 23 is formed between the substrate 30 and the filter 31 and the second photonic crystalline layer 24 is formed on the filter 31. In addition, a third photonic crystalline layer 25 with the same function as that of the reflective block member 35 of the fifth embodiment is also formed between the first and second photonic crystalline layers 23 and 24.

Each of the first, second and third photonic crystalline layers 23, 24 and 25 is formed as a stack of a number of lattice layers. In each of the lattice layers, multiple dielectric (e.g., $SiO_2$) fine lines with a width of about 360 nm or multiple semiconductor (e.g., GaAs) fine lines with a width of about 170 nm are arranged to form a lattice. Each of the photonic crystalline layers 23, 24 and 25 is a multilayer structure in which the locations of the fine lines in the $n^{th}$ layer (or the $(n+1)^{th}$ layer) shift from those of the fine lines in the $(n+2)^{th}$ layer (or the $(n+3)^{th}$ layer) by a half period.

The first and second photonic crystalline layers 23 and 24 confine the incoming light beam 60 and reflected rays thereof within the horizontal cavity filter 31 so that the beam and rays will not diffuse vertically to the substrate 30.

That is to say, the first and second photonic crystalline layers 23 and 24 are supposed to have a band structure corresponding to a photonic band gap covering the entire wavelength range of the incoming light beam 60. In that case, the incoming light beam 60 cannot enter the first and second photonic crystalline layers 23 and 24 and therefore travel in parallel to the surface of the substrate 30. As a result, the transmission loss of the horizontal cavity filter 31 can be reduced. The third photonic crystalline layer 25 should also have a band structure corresponding to a photonic band gap covering the entire wavelength range of the incoming light beam 60. Then, the incoming light beam 60 can be reflected almost totally by a surface of the third photonic crystalline layer 25 that faces the horizontal cavity filter 31.

What is claimed is:

1. A demultiplexer comprising:
   a semiconductor substrate; and
   a vertical cavity filter, which is formed on the principal surface of the substrate and transmits an incoming light beam with a predetermined wavelength,
      wherein a resonant wavelength of the filter changes depending on at which point on the principal surface the light beam is incident, and
      wherein the substrate has a recess with a slope that reflects or refracts the light beam and thereby makes the light beam incident onto the filter.

2. The demultiplexer of claim 1, wherein the filter comprises:
   a first distributed Bragg reflector, which is formed out of a first semiconductor layer on the principal surface of the substrate;
   a spacer layer, which is formed out of a second semiconductor layer on the first reflector; and
   a second distributed Bragg reflector, which is formed out of a third semiconductor layer on the spacer layer,
      wherein at least one of the first, second and third semiconductor layers has its thickness changed relative to the principal surface of the substrate.

3. The demultiplexer of claim 1, wherein the slope is a crystallographic plane that has been exposed by a wet etching process and has a predefined crystallographic plane orientation.

4. A demultiplexer comprising:
   a semiconductor substrate; and
   a photonic crystalline layer, which is formed on the principal surface of the substrate and transmits an incoming light beam with a predetermined wavelength,
      wherein a wavelength at an edge of a photonic band of the photonic crystalline layer changes in a direction parallel to the principal surface of the substrate.

5. The demultiplexer of claim 4, wherein the substrate has a recess with a slope that reflects or refracts the light beam and thereby makes the light beam incident onto the photonic crystalline layer.

6. The demultiplexer of claim 5, wherein the photonic crystalline layer is made up of a plurality of dielectric or semiconductor fine lines that are arranged like a lattice, and
   wherein the width of each said fine line or a gap between adjacent ones of the fine lines changes in a direction parallel to the principal surface of the substrate.

7. The demultiplexer of claim 4, wherein the slope is a crystallographic plane that has been exposed by a wet etching process and has a predefined crystallographic plane orientation.

8. A demultiplexer comprising a horizontal cavity filter, the filter being formed on a substrate and transmitting a part of an incoming light beam traveling in a direction substantially parallel to the surface, the part transmitted having a predetermined wavelength,
   wherein the filter includes:
      a first distributed Bragg reflector, which is formed to make an optical path of the light beam parallel to the surface of the substrate; and
      a second distributed Bragg reflector, which is formed to be spaced apart from the first reflector.

9. The demultiplexer of claim 8, wherein each of the first and second distributed Bragg reflectors is formed by arranging a plurality of dielectric or semiconductor thin plate members on the substrate at regular intervals so that the plate members cross the optical path.

10. The demultiplexer of claim 8, wherein a resonant wavelength of the filter changes depending on at which point on the substrate the light beam is incident.

11. The demultiplexer of claim 10, wherein the space between the first and second distributed Bragg reflectors changes and is tapered or stepped in the direction parallel to the surface of the substrate.

12. The demultiplexer of claim 8, further comprising:
   a first photonic crystalline layer, which is formed between the substrate and the filter; and
   a second photonic crystalline layer, which is formed on the filter.

13. The demultiplexer of claim 12, wherein each of the first and second photonic crystalline layers is made up of a plurality of dielectric or semiconductor fine lines that are arranged like a lattice.

14. A demultiplexer-receiver comprising:
   a semiconductor substrate;
   a vertical cavity filter, which is formed on the principal surface of the substrate and transmits an incoming light beam with a predetermined wavelength; and
   a plurality of light-receiving areas defined on the filter,
      wherein a resonant wavelength of the filter changes depending on at which point on the principal surface the light beam is incident, and
      wherein the substrate has a recess with a slope that reflects or refracts the light beam and thereby makes the light beam incident onto the filter.

15. The demultiplexer-receiver of claim 14, further comprising a light-absorbing layer and a window layer that are formed in this order on the filter,
   wherein the window layer includes a plurality of doped regions that are defined like islands, and
   wherein the light-receiving areas are respective parts of the light-absorbing layer that are located under the doped regions.

16. A demultiplexer-receiver comprising:

a semiconductor substrate;

a photonic crystalline layer, which is formed on the principal surface of the substrate and transmits an incoming light beam with a predetermined wavelength; and a plurality of light-receiving areas defined on the photonic crystalline layer, wherein the substrate has a recess with a slope that reflects or refracts the light beam and thereby makes the light beam incident onto the photonic crystalline layer.

17. The demultiplexer-receiver of claim 16, further comprising a light-absorbing layer and a window layer that are formed in this order on the photonic crystalline layer, wherein the window layer includes a plurality of doped regions that are defined like islands, and wherein the light-receiving areas are respective parts of the light-absorbing layer that are located under the doped regions.

* * * * *